United States Patent
Schwarz

(10) Patent No.: US 7,501,785 B2
(45) Date of Patent: Mar. 10, 2009

(54) STARTING SYSTEM FOR A SINGLE-PHASE INDUCTION MOTOR

(75) Inventor: Marcos Guilherme Schwarz, Joinville - SC (BR)

(73) Assignee: Whirlpool S.A., Sao Paulo (BR)

( * ) Notice: Subject to any disclaimer, the term of this patent is extended or adjusted under 35 U.S.C. 154(b) by 0 days.

(21) Appl. No.: 10/596,354

(22) PCT Filed: Dec. 9, 2004

(86) PCT No.: PCT/BR2004/000241

§ 371 (c)(1),
(2), (4) Date: Aug. 7, 2006

(87) PCT Pub. No.: WO2005/057773

PCT Pub. Date: Jun. 23, 2005

(65) Prior Publication Data

US 2007/0164700 A1 Jul. 19, 2007

(30) Foreign Application Priority Data

Dec. 11, 2003 (BR) .................................... 0305905

(51) Int. Cl.
*H02P 1/16* (2006.01)
(52) U.S. Cl. .................. 318/778; 318/753; 318/724; 318/751; 361/29
(58) Field of Classification Search .............. 318/778, 318/785, 786, 753, 724, 751; 361/29
See application file for complete search history.

(56) References Cited

U.S. PATENT DOCUMENTS 4,409,532 A * 10/1983 Hollenbeck et al. .......... 318/749

(Continued)

FOREIGN PATENT DOCUMENTS

DE 102 30 728 A1 4/2003

OTHER PUBLICATIONS

Patent Abstracts of Japan, vol. 2003, No. 12, Dec. 5, 2003 & JP 2003 284379 A (Fujitsu General Ltd), Oct. 3, 2003.

(Continued)

*Primary Examiner*—Rita Leykin
(74) *Attorney, Agent, or Firm*—Darby & Darby P.C.

(57) ABSTRACT

A starting system for a single-phase induction motor, comprising: a stator having a running coil (11) and a starting coil (12); a power source (F) which supplies current to said running coil (11) and said starting coil (12); a running switch (S1) and a starting switch (S2), respectively connecting the running coil (11) and the starting coil (12) to the power source (F) when in a closed condition; and a control unit (30) which is programmed to operate the running switch (S1) so as to cause a delay in the supply of the current supplied to the running coil (11) in relation to the supplied of the to the starting coil (12), during the motor start for a determined time interval which is previously defined and considered from the zero-crossing moment of the current supplied to the stator.

6 Claims, 2 Drawing Sheets

U.S. PATENT DOCUMENTS

| | | | | |
|---|---|---|---|---|
| 5,166,568 A | * | 11/1992 | Nystuen et al. | 310/254 |
| 5,325,034 A | * | 6/1994 | Reynolds et al. | 318/782 |
| 5,404,088 A | * | 4/1995 | Nanos | 318/751 |
| 5,488,834 A | | 2/1996 | Schwarz et al. | |
| 5,681,151 A | * | 10/1997 | Wood | 417/307 |
| 6,175,208 B1 | * | 1/2001 | Rose | 318/751 |
| 6,239,563 B1 | | 5/2001 | Kunz et al. | |
| 6,288,516 B1 | * | 9/2001 | Kubicko et al. | 318/772 |
| 6,415,469 B1 | * | 7/2002 | Diaz Fernandez et al. | 8/158 |
| 2001/0028239 A1 | | 10/2001 | Vanderhenst | |

OTHER PUBLICATIONS

Patent Abstracts of Japan, vol. 2000, No. 25, Apr. 12, 2001 & JP 2001 231277 A (Fujitsu General Ltd), Aug. 24, 2001.
Patents Abstracts of Japan, vol. 2003, No. 07, Jul. 3, 2003 & JP 2003 079168 A (Giken Products: KK), Mar. 14, 2003.
International Search Report for International Application No. PCT/BR2004/000241, date of mailing Mar. 8, 2005.

* cited by examiner

STARTING SYSTEM FOR A SINGLE-PHASE INDUCTION MOTOR

CROSS-REFERENCE TO RELATED APPLICATIONS

This application is a U.S. National Phase Application under 35 USC 517 371 of International Application No. PCT/BR2004/000241, filed Dec. 9, 2004 and published in English, which claims priority from Brazilian Application No. PI 0305907-7, filed Dec. 11, 2003.

1. Field of the Invention

The present invention refers to an electronic starting system of the type used in electric motors, particularly in single-phase induction motors.

2. Background of the Invention

Single-phase induction motors are widely used, due to their simplicity, strength and high performance. They are employed in household appliances in general, such as refrigerators, freezers, air conditioners, hermetic compressors, laundry machines, pumps, fans and in some industrial applications.

The known induction motors are generally provided with a cage type rotor and a coiled stator having two windings, one for the running coil and the other for the starting coil. During the normal operation of the compressor, the running coil is supplied by an AC voltage and the starting coil is temporarily supplied at the beginning of the starting operation, creating a turning magnetic field in the air gap of the stator, which condition is necessary to accelerate the rotor and start the motor.

The turning magnetic field can be obtained by supplying the starting coil with a current that is time displaced in relation to the current circulating in the running coil, preferably at an angle close to 90 degrees. This time displacement between the current circulating in both coils is obtained by constructive characteristics of the coils or by installing an external impedance in series with one of the coils, but generally in series with the starting coil, and the most used element to provide this time displacement between the currents of the main coil and the starting coil is the capacitor.

This value of the current circulating through the starting coil during the starting process of the motor is generally high, requiring the use of some type of switch which can interrupt this current after the time required to promote the acceleration of the motor has elapsed.

After the motor is caused to rotate, the magnetic field created by the running coil interacts with the field induced in the motor and maintains the necessary turning field for the motor operation.

In the cases in which the motor is designed not to use devices in series with the starting coil, namely when the time displacement between the currents is guaranteed by the constructive characteristics of the starting coil, there are generally provided in this coil thinner conductors and a smaller number of windings, guaranteeing a higher resistance/reactance ratio and thus a lower offset between voltage and current in relation to the running coil.

The disadvantage of this technique is the fact that a great time displacement is not normally achieved between the currents of the starting and running coils only by altering the constructive aspects of the starting coil, which impairs the torque of the motor during the start.

This technique is generally used in motors that will be applied to loads that do not need a very high starting moment and thus the motor can accelerate the load even without a high torque with the rotor blocked. As an advantage, the final cost when using these motors is reduced because they dispense the use of any additional element coupled to the starting coil.

The other solution to guarantee the acceleration of the motor from inertia is by using a capacitor with a high capacitance value disposed in series with the auxiliary coil, typically with a capacitance in the range from 40 μF to 300 μF, depending on the motor size. Using a capacitor of high capacity guarantees that the current in the starting coil will be advanced in about 90 degrees in relation to the current of the main coil, and that the starting torque will reach values higher than those reached without employing elements in series with the coils. The problem related to the use of a starting capacitor is the high cost of this component, the relatively short useful time of the capacitors and more inventory items of the end product.

OBJECTS OF THE INVENTION

Thus, it is an object of the present invention to provide a starting system for a single-phase induction motor, which increases the starting torque of such type of motors, without using capacitors.

It is a further object of the present invention to provide a system such as mentioned above, which increases the maximum torque supplied by the motor during acceleration.

It is a further object of the present invention to provide a starting system such as mentioned above, which reduces the power consumption of the motor during the start and the acceleration period.

SUMMARY OF THE INVENTION

These and other objects are attained by a starting system for a single-phase induction motor, comprising: a stator having a running coil and a starting coil; a power source supplying current to said running coil and said starting coil; a running switch and a starting switch, respectively connecting the running coil and the starting coil to the power source when in a closed condition, said starting switch being conducted to an open condition upon completion of the motor start; and a control unit supplied by the power source and operatively connected to the running and starting switches, in order to instruct the open and closed conditions thereof, said control unit being programmed to operate the running switch, in order to cause a delay in the supply of the current supplied to the running coil, in relation to the supply of the current supplied to the starting coil during the motor start for a determined time interval which is previously defined and considered from the zero-crossing moment of the current supplied to the stator.

BRIEF DESCRIPTION OF THE DRAWINGS

The invention will be described below with reference to the enclosed drawings, in which.

DESCRIPTION OF THE ILLUSTRATED EMBODIMENT

Figure 1:
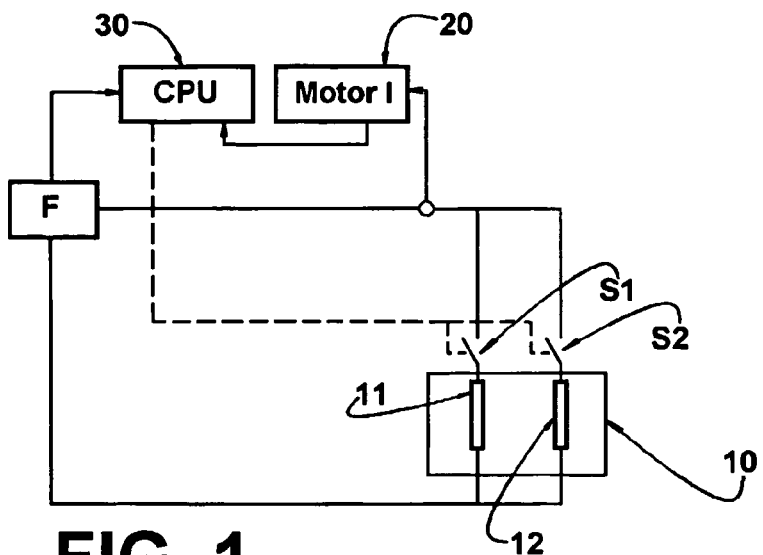
FIG. 1 illustrates, schematically, an embodiment for a starting system constructed according to the present solution.

The starting system for a single-phase induction motor of the present invention will be described in relation to a motor 10, comprising: a stator having a running coil 11 and a starting coil 12, which are supplied by an AC power source F; a running switch S1 and a starting switch S2, respectively connecting the running coil 11 and the starting coil 12 to the power source F when in a closed condition, said starting switch S2 being conducted to an open condition, interrupting the supply of electric current to the starting coil 12 upon completion of the motor start.

The starting system being described further includes a current sensor 20, connected in series between the power source F and the stator in order to measure the current circulating through the running coil 11 and through the starting coil 12 of the stator of the motor 10, and operatively connected to a control unit 30 supplied by the power source F and which is operatively connected to both the running switch S1 and the starting switch S2, so as to instruct the opening and closing thereof, as a function of determined operating conditions detected by the current sensor 20.

The running switch S1 and the starting switch S2 can be electromechanical contacts or AC static semi-conductor switches, such as for example triacs, and according to the present invention at least the running switch S1 is a semi-conductor of the triac type.

In the present solution, the current sensor 20 informs the control unit 20 about each moment the current crosses zero, so as to allow controlling the modulation on the running switch S1 of the running coil 11 of the motor 10.

The methods which are generally used for generating the starting torque in the single-phase induction motors consist in creating means for advancing the current circulating in the starting coil 12 in relation to the current circulating in the running coil 11. Thus, the motor is manufactured in order to guarantee this time displacement, or a capacitor is positioned in series with the starting coil 12 during the starting phase, as described above.

The present invention consists in delaying the current circulating in the running coil 11 of the motor 10 during the starting time, by controlling the triggering angle of the triac which acts as running switch S1.

According to the present invention, the control unit 30 is programmed to operate the running switch S1, in order to cause a delay in the current supplied to the running coil 11 in relation to the current supplied to the starting coil 12 during the motor start for a determined time interval which is previously defined and considered from the zero-crossing moment of the current supplied to the stator.

In the present solution, each time the supply current of at least one of the running coil 11 and the starting coil 12 reaches zero, the control unit 30 instructs the running switch S1 to open, which condition is maintained during the determined time interval, after which the control unit 30 instructs the running switch S1 to close.

Figure 2:
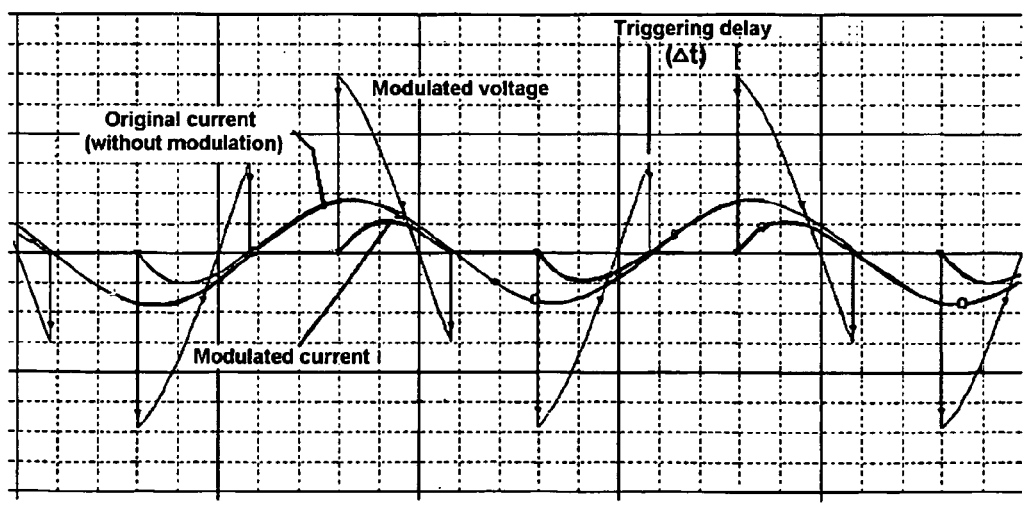
FIG. 2 illustrates, schematically, the modulated voltage and the modulated currents for the starting coil and the running coil, which are time displaced from each other during the motor start, according to the present invention.

FIG. 2 shows the waveform of the voltage applied to the running coil 11 during the starting time of the motor. The triac which acts as a running switch S1 is triggered in a determined instant and, as a characteristic of these components, when the circulating current is extinguished, in case there is no signal applied to the gate, the triac which acts as a running switch S1 returns to the open condition, which is known as automatic switching. The control unit 30 then awaits for a time interval Δt, which is measured in relation to the zero-crossing of the current circulating through any one of the running coil 11 and the starting coil 12, which is detected by the current sensor 20 in order to apply a new signal to the gate terminal and to re-trigger the triac acting as the running switch S1.

As a result of the delay in triggering the triac, which acts as a running switch S1, the current circulating through the running coil 11 will have the form presented in FIG. 2, which shows that the current obtained by shifting is delayed in relation to that which would be obtained without the control of the triac that acts as the running switch S1. Once the current in the running coil 11 is more delayed than the original condition without the modulation, the starting and the acceleration of the motor 10 will be increased as the delay in triggering the triac corresponding to the running switch S1 is increased. Namely, by delaying the current of the running coil 11, an effect similar to the advance of the current in the starting coil 12 is obtained.

On the other hand, the efficient current supplied to the running coil 11 decreases as the triggering angle increases, and therefore there is a maximum point for the delay in shifting the triac corresponding to the running switch S1 in order to guarantee the torque increase. The ideal delay for triggering this triac depends on the characteristic inductance of the running coil 11 and its behavior during the start of the motor 10, and it is adjusted according to the constructive characteristics of the motor 10 to reach the maximum possible torque increase during the start, said delay in supplying the current to the running coil 11 being for example at maximum 90 degrees.

Figure 3:
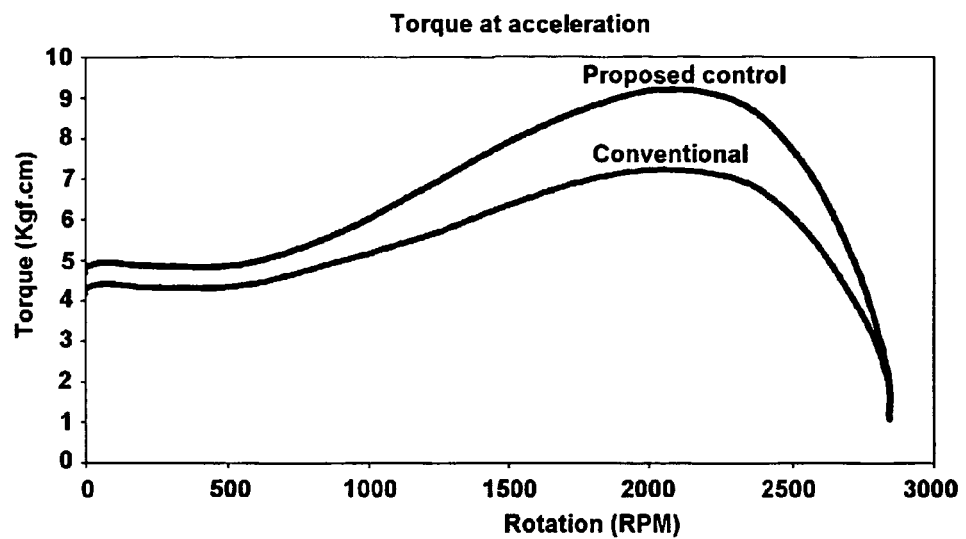
FIG. 3 illustrates, schematically, motor acceleration curves for a conventional start and for a start using the proposed starting system.

FIG. 3 illustrates the torque curves during the acceleration for the starting system of the present invention and for the conventional systems without auxiliary start elements.

The power consumed by the motor 10 during the start and the acceleration with the solution of the present invention decreases in relation to the start that is made directly from the power system, since the current supplied to the running coil 11 is much reduced in relation to the situation without trigger control.

Figure 4:
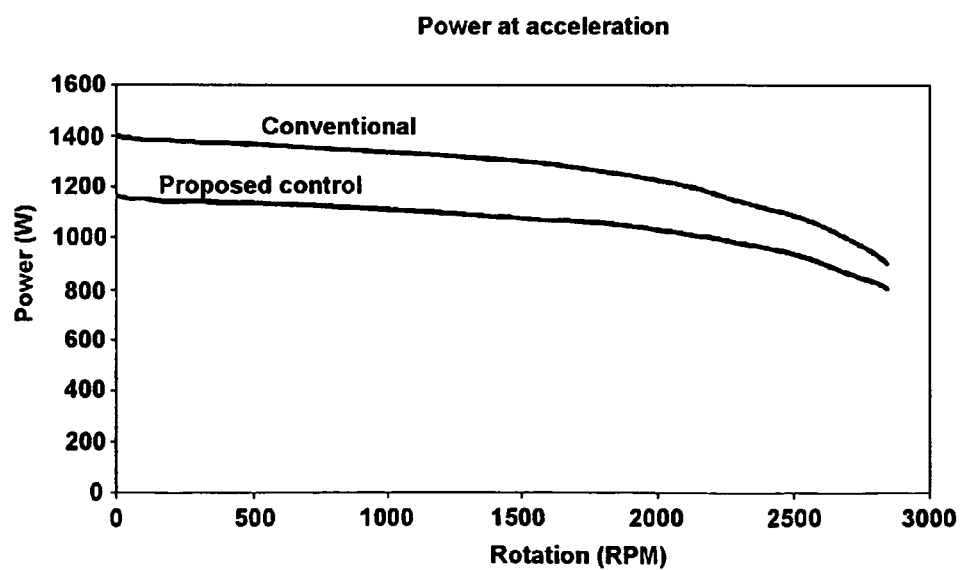
FIG. 4 illustrates, schematically, power curves obtained during the motor acceleration for its conventional start and when using the proposed starting system.

FIG. 4 illustrates the comparative curves of the power consumed by the motor during the acceleration. As a function of the increase of the torque curve during the acceleration time, the load will be accelerated more rapidly, thereby reducing the start time and the associated energy consumption.

Upon completion of the predetermined time for starting the motor 10, the triac corresponding to the starting switch S2 which is associated with the supply of the starting coil 12, is instructed to remain in the open condition and the triac which is associated with the running switch S1 to supply the running coil 11 is instructed to maintain the connection between the power source F and the running coil 11 with no delay in the conduction, i.e., upon completion of the start, the power system voltage is directly applied to the running coil 11 of the motor 10, thus guaranteeing maximum voltage and torque in the motor 10 during the normal operating time.

The invention claimed is:

1. A starting system for a single-phase induction motor comprising:
    a stator having a running coil and a starting coil;
    a power source which supplies current to said running coil and said starting coil;
    a running switch and a starting switch, each switch having an open and a closed condition, respectively connecting the running coil and starting coil to the power source when in the closed condition;
    a current sensor coupled to the stator and operatively connected to the control unit, adapted to determine when the current to at least one of the running coil and the starting coil crosses zero; and a control unit supplied by the power source and operatively connected to the current sensor, the running switch and the starting switch in order to instruct the running switch and the starting switch to assume their open and closed conditions, wherein at start up during acceleration the control unit instructs the starting switch to close, and each time the current to at least one of the running coil and the starting coil crosses zero the current sensor informs the control unit, the running switch opens, and the control unit instructs the running switch to close after a determined time interval considered from the moment the current in at least one of the running coil and the starting coil crosses zero, to thereby intermittently feed current to the running coil while continuously feeding current to the starting coil, and wherein after acceleration is complete the control unit instructs the starting switch to open.

2. The system as set forth in claim 1, wherein at startup during acceleration each time the current supplied to at least one of the running coil and the starting coil crosses zero, the control unit instructs the running switch to open.

3. The system as set forth in claim 1, wherein the determined time interval is at maximum 90 degrees.

4. The system as set forth in claim 1, wherein at least the running switch is a semi-conductor.

5. The system as set forth in claim 4, wherein the running switch is a triac.

6. The system as set forth in claim 1, wherein the determined time interval is previously defined as a function of constructive characteristics of the motor.

* * * * *